Sept. 27, 1932.  E. O. KILLIUS  1,879,312
CURRENT SUPPLY REGULATING APPARATUS
Filed March 5, 1930
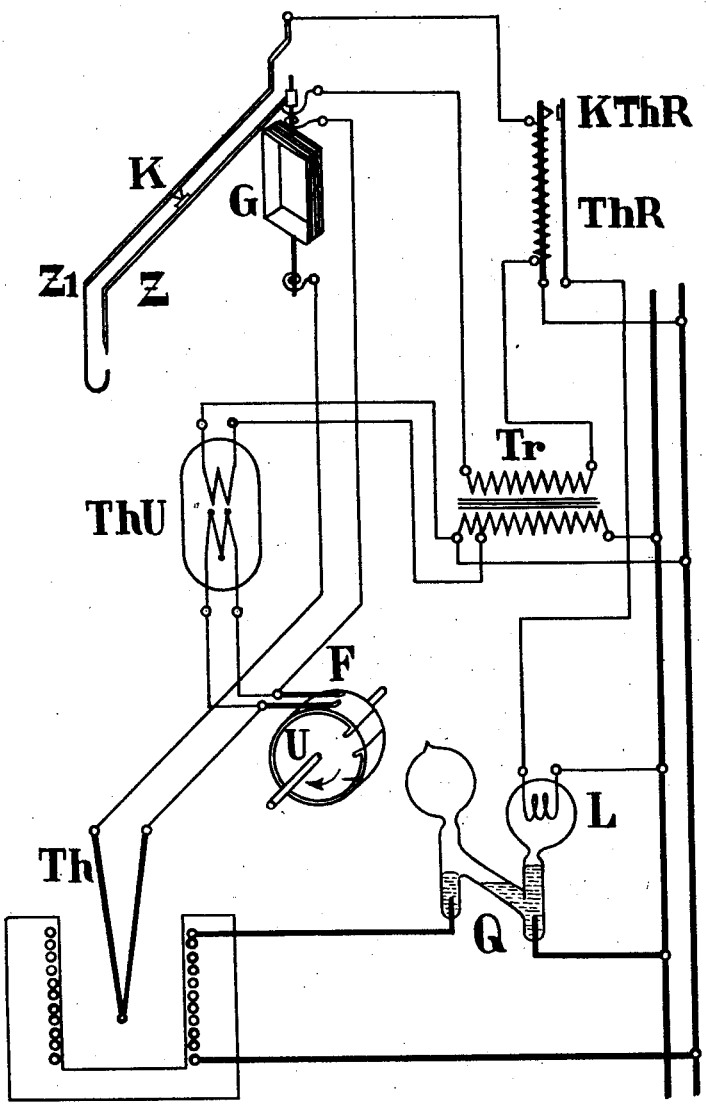

Patented Sept. 27, 1932

1,879,312

UNITED STATES PATENT OFFICE

EDUARD OTTO KILLIUS, OF HANAU-ON-THE-MAIN, GERMANY

CURRENT SUPPLY REGULATING APPARATUS

Application filed March 5, 1930; Serial No. 433,409, and in Germany March 30, 1929.

Indicators with contacts, such as galvanometers of high sensitiveness, are often used, for example when, on a certain maximum temperature being reached, the value of which is set by a contact element adjustable by hand and a counter contact situated on the indicator comes into contact when then this maximum temperature is reached, a furnace is to be cut out through several intermediate relays and again switched in at the breaking of the contact, so as to produce an automatic temperature regulation.

In this case an absolutely reliable working of the temperature indicator is essential, which instrument however, owing to its high sensitiveness, can only possess a very small angle of deflection and can consequently only exert a very slight contact pressure.

The great disadvantage of these regulating arrangements, which cut out on the closing of a maximum contact by the indicator contact of the temperature indicating instrument, lies in the fact that the interrupting of the current can only occur, when a regulating circuit is properly produced through the closing of the maximum contact and hand contact. In the same way the reswitching in of the open circuit is dependent on the indicator contact not adhering to the maximum contact, owing to the closing of the regulating circuit, and being capable of again moving away from the same. In this instance there is a danger of valuable material being overheated in the furnace.

According to the invention the temperature indicating instrument is provided, besides with the known contact movable with the indicator and therefore dependent in its setting on the height of the temperature, also with a maximum contact adjustable by hand, against which the indicator contact bears in the inoperative position and until the minimum temperature is exceeded, a closed circuit being kept closed by the closing of the two contacts. This circuit maintains in closed position the switch or regulator for the main circuit by electric influencing means, such as coils and the like, in opposition to the action of a counter force, for example a spring, which consequently automatically interrupts the main circuit as soon as the closed circuit has been transformed into an open circuit by the continuing movement of the indicator contact owing to the temperature being exceeded.

Due to the peculiarity of the arrangement according to the invention, a main circuit can consequently only be established, if the contacts on the temperature indicating instrument are in such condition, that they can close the circuit. In the event of any failure of the temperature measuring instrument an open circuit or heating circuit will not be obtained at all, so that there is no danger for the machine or for the furnace and the material being heated therein.

The employment of a closed circuit in conjunction with minimum contacts however also reduces and prevents the second danger with such sensitive contacts, namely the sticking of the contacts.

According to a further feature of the invention a sufficiently strong current impulse for separating the two contacts of the temperature indicating instrument is sent from an auxiliary source of current for this purpose into the electric circuit influencing the position of the indicator temperature of the temperature indicating instrument with the aid of a time clockwork or similar device liberating an adjusting force in certain short intervals of time.

An embodiment of the invention is illustrated diagrammatically by way of example in the only figure of the accompanying drawing.

In the drawing $Th$ is a thermo element, which, on being heated in a furnace, produces the necessary current for operating the temperature measuring instrument $G$. $Z$ is an indicator of this temperature measuring instrument, which deflects, according to the electro motive force produced by the thermo element T$h$. The indicator is held, by means of an indicator $Z_1$ operated by hand, in a position which it would attain without this support only at a certain minimum electro motive force of the thermo element T$h$. The indicator Z only leaves the support afforded by the indicator $Z_1$, when the minimum electro motive force has been exceeded. The indicator Z movable by the temperature measuring instrument and the indicator $Z_1$, rotatable by hand, touch one another through contacts K.

With the aid of these contacts K and the indicators Z and $Z_1$ a closed circuit is formed, which branches off from the secondary coil of the transformer T$r$ supplied from the net on the primary side. The closed circuit current flows from the indicator Z through the secondary coil of the transformer T$r$ to the coil of a bimetal rod and thence to the indicator $Z_1$. This coil and the bimetal rod form parts of the thermo relay T$h$R. This thermo relay is so constructed, that the bimetal rod bends on being heated and closes the contact K T$h$ R, but opens the same when the bimetal rod is cooling. The closed circuit, which is kept closed by the contacts K, therefore heats the bimetal rod and consequently closes the contact K T$h$ R. By the closing of this contact a circuit between the lamp L and the net is closed, which passes from one pole of the net through the bimetal rod to the closed contact KT$h$R and thence through the heating coil of the lamps L to the other pole of the net. By the connecting up of the lamp L in the circuit the mercury switch Q is closed, thereby supplying the current from the net to the working machine, for example the electric furnace, which then heats the thermo element T$h$.

The arrangement above described operates in the following manner:

As soon as the thermo element T$h$ heated by the furnace produces a continuous current of a value surpassing the set minimum e. m. f., the temperature measuring instrument G moves the indicator Z away from the indicator $Z_1$ and thereby breaks the contact K.

Consequently the closed circuit supplied from the secondary coil of the transformer T$r$ is interrupted, so that the heating of the bimetal rod in the thermo relay T$h$R ceases. As soon as the cooling has progressed sufficiently far, the bimetal rod breaks the contact K T$h$ R. Consequently the lamp L of the mercury switch Q is switched out and this switch cuts off the supply of current from the net to the furnace.

When the furnace has cooled down so that the thermo element T$h$ indicates an accordingly reduced voltage, the indicator Z approaches and finally closes the contact K, so that the operation above described is repeated.

Between the temperature measuring instrument G and the thermo element T$h$ a contact breaker F in the shape of collector springs is connected up in the circuit. As long as the collector springs F are conductively connected by the contact situated thereunder the thermo element T$h$ is switched on the measuring instrument G. The collector springs F are however lying on an interrupter U, which is slowly turned for example by a clockwork mechanism. Besides the thermo element T$h$ the thermo converter T$h$U is connected up with the interrupter. This thermo converter conducts the thermic force produced by the e. m. f. generated by the therms element T$h$ to the collector springs F, where it is switched in and off in certain determined intervals of time. Through this voltage of the thermo converter T$h$U added in certain intervals of time to the voltage of the thermo element T$h$ the indicator Z moves at certain intervals away from the minimum contact of the indicator $Z_1$, whereas, on the shorting the additional e. m. f. through the cylinder of the interrupter U, the indicator Z is moved back into its initial position. This prevents the contacts K sticking on the indicator Z and on the indicator $Z_1$.

The invention can be generally used for regulating electric current consumers. The use of the thermo relay T$h$R in electric furnaces has proved very satisfactory and possesses advantages in comparison with electro magnetic relays or relays formed by amplifier valves. The electro magnetic relays possess the inconvenience, that their armatures tend to flutter, if the circuit is not properly closed. In the case of sensitive temperature measuring instruments the contact of the movable indicators of the temperature measuring instrument will never be able to bear absolutely quietly against the contact adjustable by hand, especially when heavy vibrations occur in the building. Moreover, when connected up with alternating current net, the armature of the relay will oscillate, according to the periodicity and consequently also render more difficult the obtaining of a reliable contact giving. In the case of alternating current relays a much stronger current must be used for operating the relay, which naturally can only have a detrimental effect on the contacts and which must absolutely be avoided with reliable instruments. If however amplifier valves are used in known connections, these require such auxiliary apparatus, when connecting up to an alternating current net, that the reliability becomes very questionable.

It is advisable to mount the counter contact of the bimetal rod of the thermo relay T*h*R on a strip of similar material, which however should be of slightly shorter length. By this means a good compensation for the fluctuations in room temperature is obtained.

A very sensitive thermo relay is produced, if the heating coil of the bimetal rod is so dimensioned that a voltage of about 20 volts suffices to heat the bimetal to such a temperature, that a sure contact giving occurs. The lower voltage is to be recommended, in order to keep a static charging of the two indicators on the temperature measuring instrument as small as possible, when the contacts are open. Owing to the slight directional forces possessed by such instruments it is impossible to avoid mutual attraction, when the indicators are under current. This difficulty can only be kept within reasonable bounds by keeping the voltage as low as possible.

I claim:

1. An apparatus for regulating electric current consumers, especially electric furnaces by means of a temperature measuring instrument controlled by a thermo element, comprising in combination with the temperature measuring instrument, a movable indicator on said instrument adjustable by temperature fluctuation, a contact on and movable with said indicator adjustable by the temperature, a minimum contact adjustable by hand connected up in the regulator circuit and adapted to support said movable indicator contact in inoperative position, thereby maintaining a closed circuit until the minimum temperature is exceeded, a main circuit, a switching device in said main circuit, a thermo-relay serving as intermediate relay adapted to be actuated by said closed circuit holding said switch in closed position so that in the event of failure of the said indicator contact the main current is interrupted.

2. An apparatus for regulating electric current consumers as specified in claim 1, comprising in combination with the switching device for the main circuit held in closed position by the closed circuit and the thermo-relay serving as intermediate relay, a counter force adapted to open said switching device, a resilient bimetal rod of said thermo-relay, a relay circuit connected up with said rod, a heating coil on said bimetal rod supplied with current from said closed circuit, a contact on the free end of said bimetal rod adapted to bend owing to the heat produced and then to close the relay circuit, but, owing to its resiliency adapted to return into its straight position as soon as the closed circuit is interrupted by the interruption of the regulator circuit.

3. In an apparatus for regulating electric current consumers as specified in claim 1, comprising in combination with the indicator contacts, an electrically heated thermo-element serving as auxiliary source of current.

4. Apparatus for regulating electric current consumers as specified in claim 1, comprising in combination with the movable indicator contact in the contact measuring instrument actuated by the regulator current, an auxiliary source of power, a device releasing a displacing force adapted to switch in or out said auxiliary source of power at certain predetermined intervals, a time clockwork mechanism controlling said device, said contacts in the contact measuring instrument being thereby separated the one from the other.

In testimony whereof I affix my signature.

EDUARD OTTO KILLIUS.